(12) United States Patent
Mori

(10) Patent No.: US 10,521,167 B2
(45) Date of Patent: Dec. 31, 2019

(54) COMMUNICATION SYSTEM AND RELAY DEVICE

(71) Applicant: BROTHER KOGYO KABUSHIKI KAISHA, Nagoya, Aichi (JP)

(72) Inventor: Takafumi Mori, Nagoya (JP)

(73) Assignee: BROTHER KOGYO KABUSHIKI KAISHA, Nagoya, Aichi (JP)

( * ) Notice: Subject to any disclaimer, the term of this patent is extended or adjusted under 35 U.S.C. 154(b) by 85 days.

(21) Appl. No.: 15/711,687

(22) Filed: Sep. 21, 2017

(65) Prior Publication Data

US 2018/0018138 A1 Jan. 18, 2018

Related U.S. Application Data

(62) Division of application No. 14/672,460, filed on Mar. 30, 2015, now Pat. No. 9,811,295.

(30) Foreign Application Priority Data

Mar. 31, 2014 (JP) ................................ 2014-072189

(51) Int. Cl.
*G06F 3/12* (2006.01)
(52) U.S. Cl.
CPC .......... *G06F 3/1236* (2013.01); *G06F 3/1204* (2013.01); *G06F 3/1222* (2013.01); *G06F 3/1238* (2013.01); *G06F 3/1288* (2013.01)
(58) Field of Classification Search
None
See application file for complete search history.

(56) References Cited

U.S. PATENT DOCUMENTS

| 8,885,199 | B2 | 11/2014 | Minagawa | |
|---|---|---|---|---|
| 2007/0268518 | A1* | 11/2007 | Yokoyama | ............ G06F 21/608 |
| | | | | 358/1.15 |
| 2012/0218599 | A1* | 8/2012 | Kashioka | .............. G06F 3/1222 |
| | | | | 358/1.15 |

(Continued)

FOREIGN PATENT DOCUMENTS

JP 2008-004073 A 1/2008

OTHER PUBLICATIONS

Office Action dated Sep. 16, 2016 from parent U.S. Appl. No. 14/672,460.

(Continued)

*Primary Examiner* — Mohammad H Ghayour
*Assistant Examiner* — Pawan Dhingra
(74) *Attorney, Agent, or Firm* — Scully, Scott, Murphy & Presser, P.C.

(57) ABSTRACT

Each of a plurality of servers may transmit first server identification information identifying the first server to the relay device. An terminal may transmit first access target information to a relay device. The relay device may store the first server identification information in a first memory of the relay device, in association with the first access target information. The terminal may transmit second access target information to a second server. The second server may transmit the received second access target information and second server identification information to the relay device. The relay device may cause the second server to access the image forming device identified by the second access target information.

7 Claims, 8 Drawing Sheets

(56) References Cited

U.S. PATENT DOCUMENTS

| | | | | |
|---|---|---|---|---|
| 2013/0135668 A1* | 5/2013 | Minagawa | ............ | G06F 3/1204 |
| | | | | 358/1.15 |
| 2014/0226179 A1* | 8/2014 | Minagawa | ............ | G06F 3/1204 |
| | | | | 358/1.15 |
| 2014/0268233 A1* | 9/2014 | Kawai | ................... | G06F 3/1218 |
| | | | | 358/1.15 |
| 2014/0368867 A1* | 12/2014 | Kim | ...................... | G06F 3/1204 |
| | | | | 358/1.15 |
| 2015/0261482 A1* | 9/2015 | Takano | ................. | G06F 3/1205 |
| | | | | 358/1.15 |

OTHER PUBLICATIONS

Notice of Allowance dated Jul. 5, 2017 from parent U.S. Appl. No. 14/672,460.

\* cited by examiner

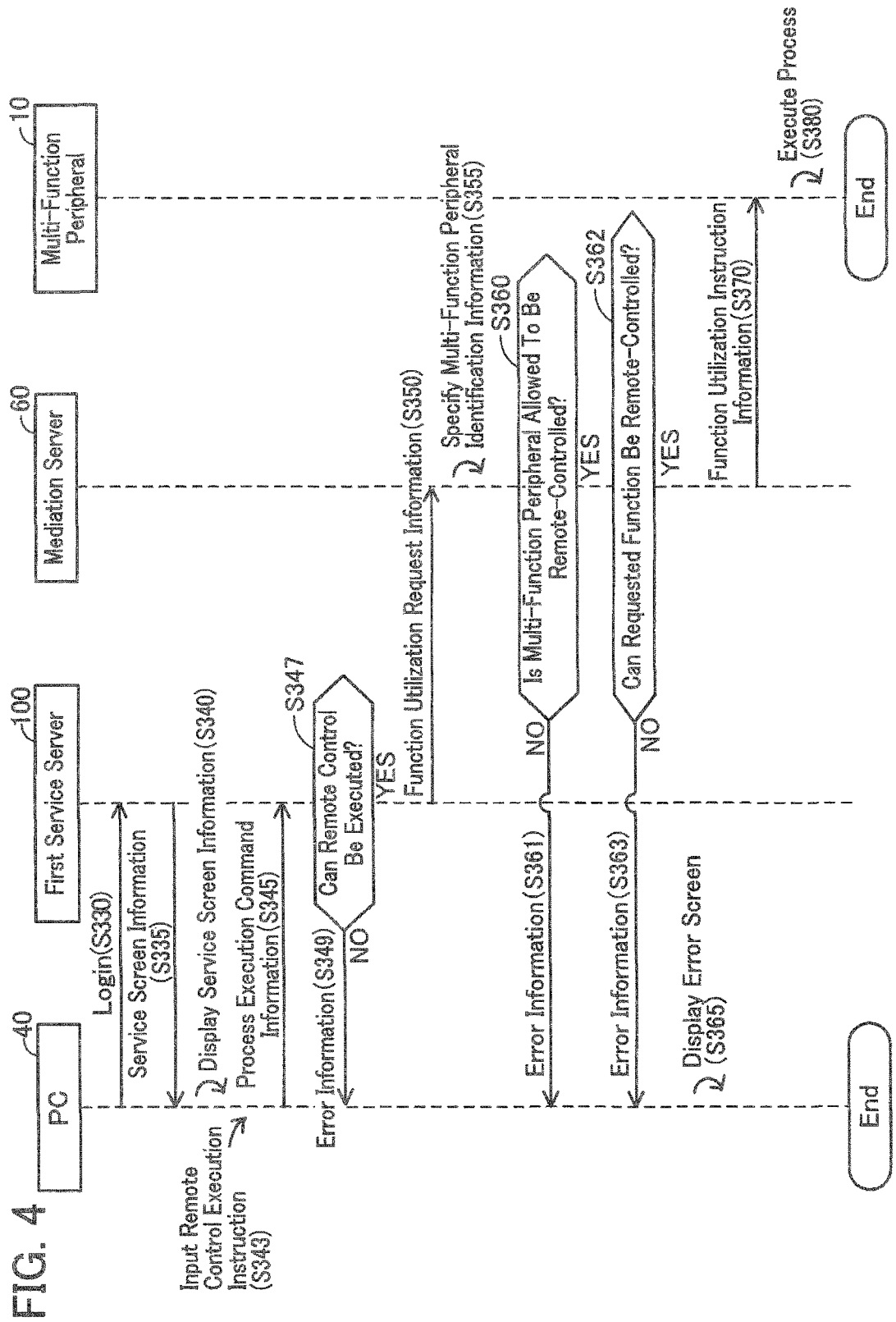

| Service Name | Service Identification Information |
|---|---|
| First Service | SSSSSS1 |
| Second Service | SSSSSS2 |
| Third Service | SSSSSS3 |

| User Name | Mediation Server User ID | Mediation Server Password | Multi-Function Peripheral Identification Information | Mounted Function Information |
|---|---|---|---|---|
| User A | user-a@xx.com | ******* | MFP-10 | Print Function Scan Function Fax Function Copy Function |
| User B | user-b@yy.com | ******* | MFP-11 | Print Function Scan Function |

| First Service User ID | Token Information | Refresh Token Information |
|---|---|---|
| User A | fbwkjr4irufjgn4l | Kjerfkjfrkahwfwk |
| User B | f3k4h35ofgj2lg | Vxckdgreghrefes |

FIG. 8

| Registration Service Identification Information | Scope Information | Mediation Server User ID | Access Key Information | Token Information | Refresh Token Information |
|---|---|---|---|---|---|
| SSSSSS1 | Print Function, Scan Function | User A | xxxx | fbwkjr4irufjgn4l | Kjerfkjfrkahwfwk |
| SSSSSS2 | Scan Function | User B | yyyy | f3k4h35ofgj2lg | Vxckdgreghrefes |

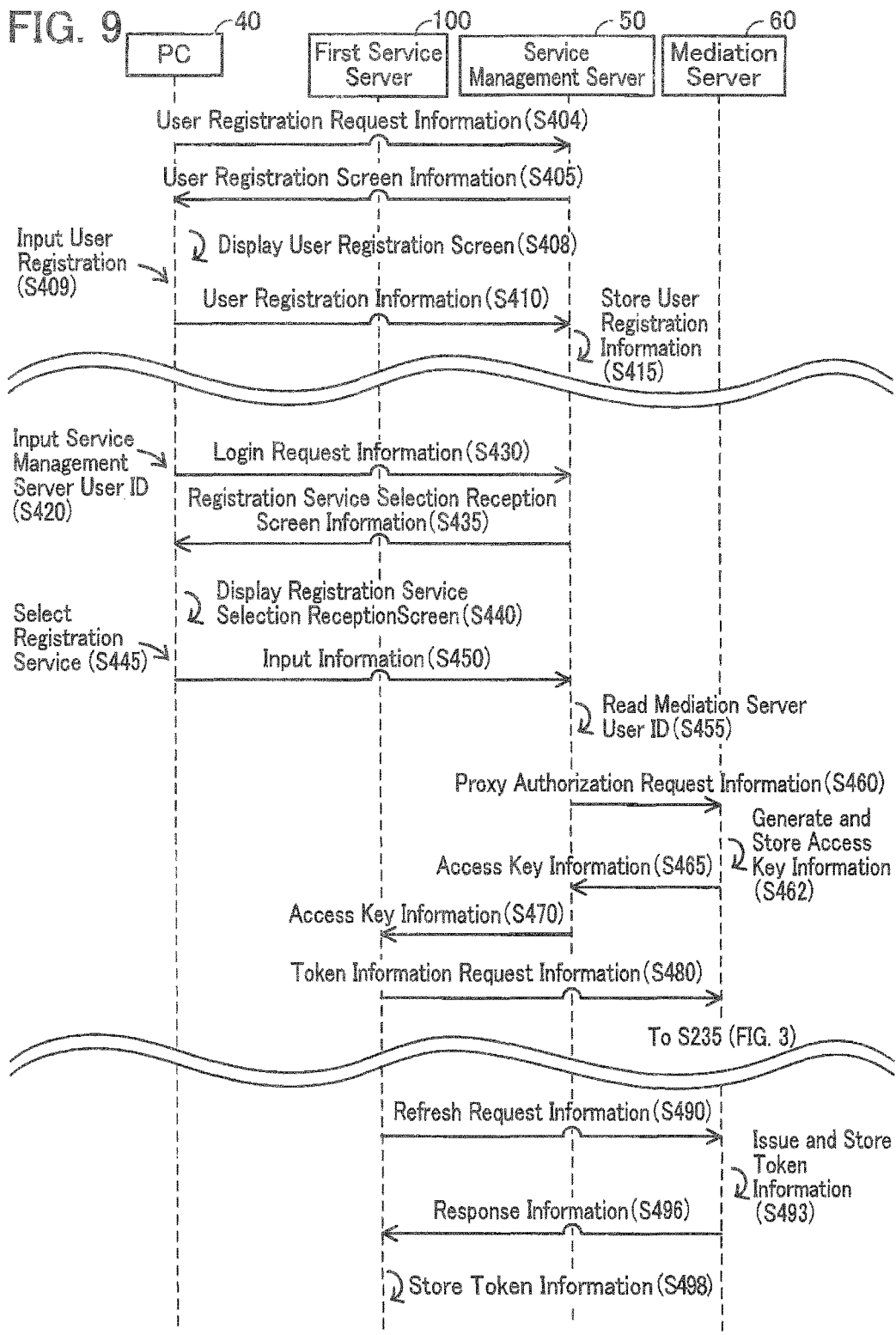

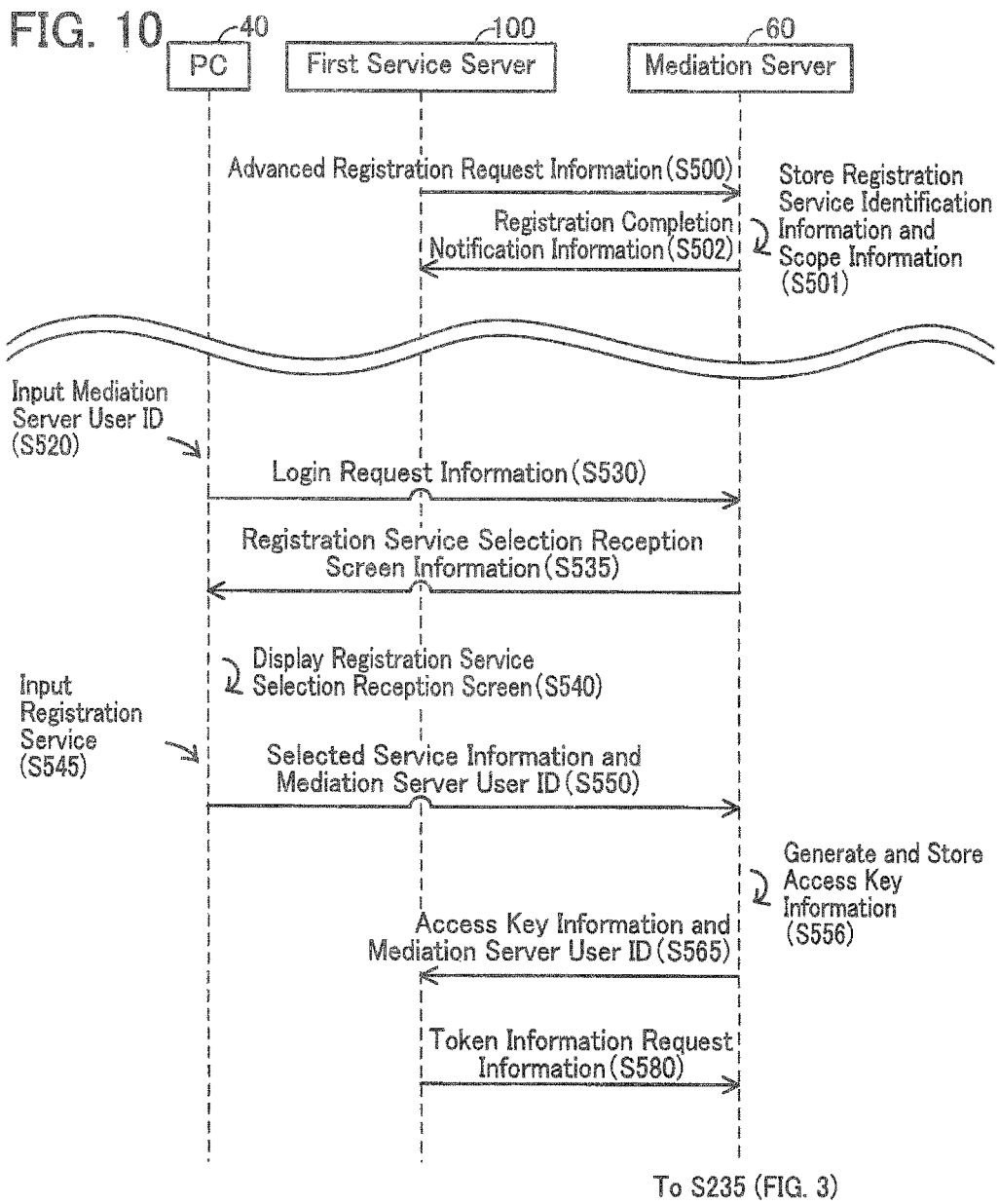

COMMUNICATION SYSTEM AND RELAY DEVICE

CROSS-REFERENCE TO RELATED APPLICATIONS

This application is a divisional application of U.S. patent application Ser. No. 14/672,460 filed on Mar. 30, 2015 and claims priority to Japanese Patent Application No. 2014-072189, filed on Mar. 31, 2014, the contents of each of which are hereby incorporated by reference into the present application.

TECHNICAL FIELD

The present specification discloses a communication system or the like to which an image processing device, a server, and the like are connected.

DESCRIPTION OF RELATED ART

A system that performs an authentication process by transmitting client software for allowing a client device to use the functions of a printer or the like to the client device and allowing the client device to execute the client software when the functions are used is known.

SUMMARY

In the technique described above, the client device is forced to use the functions using the client software. In this case, it may be often difficult to allow the client device to use the functions appropriately.

One technique disclosed in the present application is a communication system comprising a plurality of image forming devices, a plurality of servers, a terminal, and a relay device comprising a first memory. Each image forming device, each server, the terminal, and the relay device may be configured to communicate with each other. A first server, which is one each of the plurality of servers, may be configured to receive registration information that indicates the first server is to be registered in the relay device. The first server may be configured to transmit first server identification information identifying the first server to the relay device in response to receiving the registration information. The terminal may be configured to transmit first access target information to the relay device. The first access target information may identify a first image forming device associated with the first server identification information. The relay device may be configured to store the first server identification information in the first memory, in association with the first access target information transmitted from the terminal. The terminal may be further configured to receive a target designating operation that designates a particular image forming device. The particular image forming device may be one of the plurality of image forming devices. The terminal may be further configured to receive a process designating operation that designates a particular image forming process. The terminal may be further configured to transmit second access target information and process information to a second server. The second access target information may indicate the particular image forming device. The process information may indicate the particular image forming process. The second server may be one of the plurality of servers. The second server may be configured to, when the second access target information and the process information transmitted from the terminal are received, transmit the received second access target information, the process information, and second server identification information to the relay device. The second server identification information may identify the second server. The relay device may be further configured to determine whether the first server identification information indicates the second server that is identified by the second server identification information. The relay device may be further configured to determine whether the first access target information indicates the particular image forming device that is identified by the second access target information. When it is determined that the first server identification information indicates the second server that is identified by the second server identification information, and the first access target information indicates the particular image forming device that is identified by the second access target information, The relay device may be further configured to transmit, to the particular image forming device, the process information. The particular image forming device may be configured to, when the process information is received, execute the particular image forming process.

Other technique disclosed in the present application is a communication system comprising a plurality of image forming devices, a server, a terminal, and a relay device. The relay device may be configured to connect with the plurality of image forming devices, the terminal, and the server. The server may be a device configured to access the plurality of image forming devices via the relay device. The server may be configured to transmit first server identification information identifying the server to the relay device. The terminal may be configured to transmit first access target information to the relay device in a state of being associated with the first server identification information. The first access target information may identify an image forming device that is an access target of the server. The relay device may be configured to store the first server identification information transmitted from the server and the first access target information transmitted from the terminal in a first memory provided in the relay device, by associating the first server identification information and the first access target information with each other. The server may be configured to transmit, to the relay device, second access target information and second server identification information, the second access target information identifying an image forming device that is to be an access target of the server, and the second server identification information identifying the server. The relay device may be configured to determine whether the first server identification information indicates the server that is identified by the second server identification information. The relay device may be configured to determine whether the first access target information indicates the image forming device that is identified by the second access target information. When it is determined that the first server identification information indicates the server that is identified by the second server identification information, and the first access target information indicates the image forming device that is identified by the second access target information, The relay device may be configured to cause the server to access the image forming device identified by the second access target information.

Other technique disclosed in the present application is a relay device comprising a communication interface configured to communicate with a plurality of image forming devices, a plurality of servers, and a terminal. The relay device may comprise a processor and a memory storing computer-readable instructions. The computer-readable instructions, when executed by the processor, may cause the relay device to receive first server identification information via the communication interface. The first server identification information may be transmitted from a first server selected from among the plurality of servers, and may identify the first server. The computer-readable instructions may cause the relay device to receive first access target information via the communication interface in a state of being associated with the first server identification information. The first access target information may be transmitted from the terminal, and may identify a first image forming device to be an access target of the first server. The computer-readable instructions may cause the relay device to store the received first server identification information and the received first access target information in the memory, in association with each other. The computer-readable instructions may cause the relay device to receive second access target information and second server identification information via the communication interface from a second server selected from among the plurality of servers. The second access target information may identify a second image forming device that is an access target of the second server, and may have been transmitted to the second server from the terminal. The second server identification information may identify the second server. The computer-readable instructions may cause the relay device to determine whether the first server identification information indicates the second server that is identified by the second server identification information. The computer-readable instructions may cause the relay device to determine whether the first access target information indicates the second image forming device that is identified by the second access target information. When it is determined that the first server identification information indicates the second server that is identified by the second server identification information, and the first access target information indicates the second image forming device that is identified by the second access target information, The computer-readable instructions may cause the relay device to cause the second server to access the second image forming device identified by the second access target information.

Other technique disclosed in the present application is a relay device comprising a communication interface, a processor and a memory. The communication interface may be configured to communicate with a plurality of image forming devices, a server, and a terminal. The memory may store computer-readable instructions. The computer-readable instructions, when executed by the processor, cause the relay device to receive first server identification information identifying the server via the communication interface from the server. The computer-readable instructions may cause the relay device to receive first access target information from the terminal in a state of being associated with the first server identification information. The first access target information may identify an image forming device that is an access target of the server. The computer-readable instructions may cause the relay device to store the first server identification information transmitted from the server and the first access target information transmitted from the terminal in the memory, by associating the first server identification information and the first access target information with each other. The computer-readable instructions may cause the relay device to receive second access target information and second server identification information via the communication interface. The second access target information may identify an image forming device that is to be an access target of the server. The second server identification information may identify the server. The relay device may be configured to cause the server to access the image forming device identified by the second access target information in a case that a combination of the image forming device identified by the second access target information transmitted from the server and the server identified by the second server identification information transmitted from the server matches a combination of the image forming device identified by the first access target information stored in the memory and the server identified by the first server identification information stored in the memory.

BRIEF DESCRIPTION OF DRAWINGS

FIGS. 2 to 4 are sequence diagrams illustrating an operation example of the communication system;

FIG. 5 is a diagram illustrating an example of a service table;

FIG. 6 is a diagram illustrating an example of a user table;

FIG. 7 is a diagram illustrating an example of a token table;

FIG. 8 is a diagram illustrating an example of an authorization table;

FIG. 9 is a sequence diagram illustrating an operation example of a communication system of Embodiment 2; and FIG. 10 is a sequence diagram illustrating an operation example of a communication system of Embodiment 3.

EMBODIMENT (Embodiment 1) (System Configuration)

Figure 1:
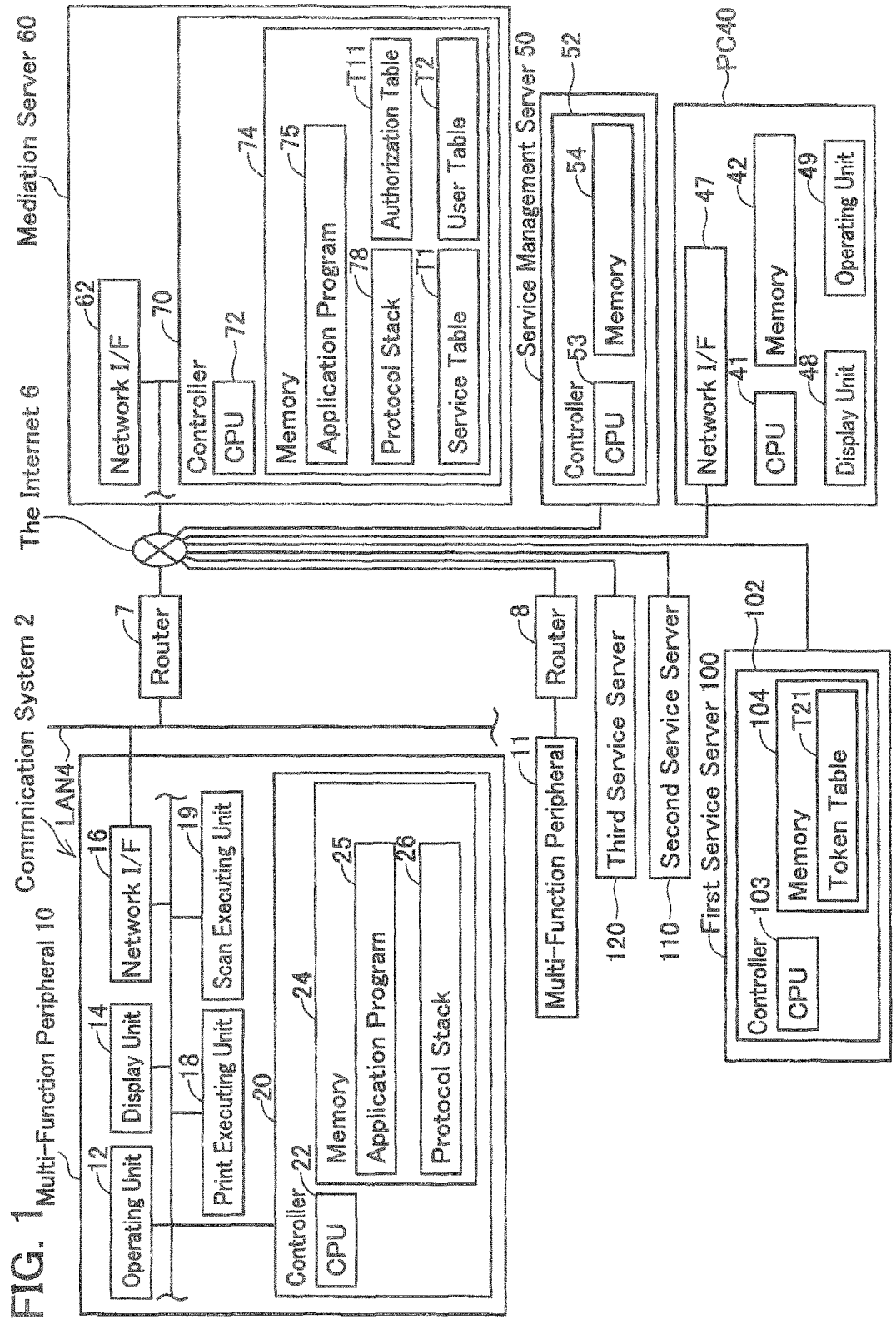
FIG. 1 illustrates a configuration of a communication system.

As shown in FIG. 1, a communication system 2 includes routers 7 and 8, multi-function peripherals 10 and 11, a mediation server 60, a first service server 100, a second service server 110, a third service server 120, a PC 40, a service management server 50. The multi-function peripheral 10 is connected with the Internet 6 via a LAN 4 and the router 7. The multi-function peripheral 11 is connected with the Internet 6 via the router 8. The mediation server 60, the first service server 100, the second service server 110 and the third service server 120 are connected with the Internet 6.

(Structure of Multi-Function Peripheral 10)

The multi-function peripheral 10 may execute a Printing function, a FAX function, a Scan function, a Copy function, or the like. The multi-function peripheral 10 comprises an operating unit 12, a display unit 14, a network interface (described as "I/F," hereinafter) 16, a print executing unit 18, a scan executing unit 19, and a controller 20. The operating unit 12 has a plurality of keys. A user can input various instructions to the multi-function peripheral 10 by operating the operating unit 12. The display unit 14 is a display for displaying various pieces of information. The network I/F 16 is connected to the router 7 via the LAN 4. The network I/F 16 is capable of communicating with the first service server 100, the second service server 110 and the third service server 120. The print executing unit 18 comprises an inkjet or laser printing mechanism. The scan executing unit 19 comprises a scan mechanism such as a CCD or CIS. The controller 20 comprises a CPU 22 and a memory 24. The memory 24 may be a computer readable storage medium. The computer readable storage medium is a non-transitory medium, such as a ROM, RAM, flash memory, hard disk, etc. The ROM, RAM, flash memory, hard disk, and the like are tangible media. An electrical signal that carries a program downloaded from a server or the like on the Internet is a computer-readable signal medium which is one kind of a computer-readable medium, but does not belong to a non-transitory computer-readable storage medium. The memory 24 stores an application program 25 and a protocol stack 26. A lock flag, service change information, and the like are stored in the memory 24. The content of the lock flag and the service change information will be described later.

The CPU 22 executes a process for using various services described above provided by the first to third service servers 100 to 120 according to the application program 25 stored in the memory 24. The CPU 22 executes a protocol process such as Hypertext Transfer Protocol (referred to as HTTP) or Extensible Messaging and Presence Protocol over Bidirectional-streams over Synchronous HTTP (referred to as XMPP over BOSH) according to the protocol stack 26 stored in the memory 24. The CPU 22 establishes a session according to XMPP over BOSH (described later) and establishes a connection according to HTTP by the protocol process. A session according to XMPP over BOSH is also referred to an XMPP session. Moreover, XMPP over BOSH is an example of a session establishment-type protocol. The multi-function peripheral 10 transmits information requesting establishment of an XMPP session to the mediation server 60 and the mediation server 60 receives the request information. Subsequently, the multi-function peripheral 10 transmits the information requesting establishment of an XMPP session periodically to the mediation server 60, and the mediation server 60 receives the request information. In this way, it is possible to perform server push in which a HTTP request transmitted from the mediation server 60 is transferred to the multi-function peripheral 10 over the router 7.

Since the structure of the multi-function peripheral 11 is the same as the structure of the multi-function peripheral 10, the description thereof will not be provided.

Some features relating to the description in the present specification are hereby explained. In the present specification, the description "the CPU 22 of the multi-function peripheral 10 transmits or receives various information" includes the technical meaning "the CPU 22 of the multi-function peripheral 10 outputs or acquires various information via the network interface 16". Similar features exist regarding the CPU 72 and the network interface 62 of the mediation server 60. Similar features exist regarding the first service server 100, the second service server 110 and the third service server 120.

Here, a definition of the words "data" and "information" will be explained. In the present specification, "information" is used as a concept superordinate to "data". Consequently, "A data" may be rephrased as "A information". Further, even if the "information" has a different format as "data" (e.g., text format, binary format, flag format, etc.), this is treated as the same information as long as it is recognized that the meaning is the same. For example, as long as the device treats this as information indicating that the number of print copies is two parts, data of the text format "COPY=2", and data of the binary format "10" is the same information. However, the discrimination between "data" and "information" is not strict but exceptions are allowed.

(Structure of Mediation Server 60) The mediation server 60 is a server independent of the first service server 100, the second service server 110 and the third service server 120. The mediation server 60 is a server for mediating accesses between the first to third service servers 100 to 120 and the multi-function peripherals 10 and 11. The mediation server 60 is a server provided by a vendor or a manufacturer of the multi-function peripherals 10 and 11. The mediation server 60 includes a network I/F 62 and a controller 70.

The controller 70 comprises a CPU 72 and a memory 74. An application program 75, a protocol stack 78, a service table T1, a user table T2 and an authorization table T11 are stored in the memory 74. As with the memory 24, the memory 74 may be a computer readable storage medium. The CPU 72 executes various processes described later according to the application program 75. The content of the processes that the CPU 22 executes according to the protocol stack 78 corresponds to the content described in connection with the protocol stack 26 of the multi-function peripheral 10.

FIG. 5 illustrates an example of the service table T1. A service name 511 indicates the name of each of the first to third services. Service identification information 512 is information for identifying the respective first to third services. The service table T1 may be stored in advance in the mediation server 60 by an administrator of the mediation server 60, the administrators of the first to third service servers 100 to 120, or the like.

FIG. 6 illustrates an example of the user table T2. A user name 521 is information indicating the name of each of the users registered in the user table T2. A mediation server user ID 522 is information for identifying the respective users registered in the user table T2. A mediation server password 523 is information used when performing user authentication (see S165). Multi-function peripheral identification information 524 is information for identifying a multi-function peripheral possessed by each of the users registered in the user table T2. Mounted function information 525 is information indicating the type of a function mounted on the multi-function peripheral possessed by the user. The respective items of information including the user name 521 to the mounted function information 525 are stored in the user table T2 in a mutually associated state. In this example, although one user possesses one device, one user may possess a plurality of devices. Moreover, the multi-function peripherals possessed by the user may have different mounted function information.

The user table T2 is a table that is stored when a user creates a user account (that is, the mediation server user ID 522 and the mediation server password 523) of the mediation server 60. A specific example will be described. A user who wants to register to the mediation server 60 accesses the mediation server 60 using an information communication terminal such as the PC 40 or the like. Moreover, information ranging from the user name 521 to the mounted function information 525 is registered in the user table T2. In this way, user registration is completed and a user account is created. After that, the registered user can be authenticated by the mediation server 60 using the user account.

(Structure of PC 40)

The structure of the PC 40 will be described. The PC 40 includes a CPU 41, a memory 42, a network I/F 47, a display unit 48, and an operating unit 49. The display unit 48 can display various items of information. The operating unit 49 includes a keyboard and a mouse. The user can input various instructions and information to the PC 40 by operating the operating unit 49. The network I/F 47 is connected to the Internet 6.

(Structure of First to Third Service Servers)

The first to third service servers 100 to 120 are servers that provide the first to third services, respectively. The first to third services are remote control services. The remote control service is a service that implements from the service servers the remote control of at least a portion of the plurality of functions (for example, information acquisition, print function, Fax function, scan function, and the like) of the multi-function peripherals 10 and 11 via the Internet 6.

The structure of the first service server 100 will be described. The first service server 100 includes a controller 102. The controller 102 includes a CPU 103 and a memory 104. A token table T21 is stored in the memory 104. FIG. 7 illustrates an example of the token table T21. A first service user ID 541 is information for identifying users A and B and is information used for registering a user to the first service. The content of token information 542 and refresh token information 543 will be described later. The information stored in the token table T21 is registered in S240 described later.

Moreover, scope information is stored in the memory 104. The scope information is information indicating a function that the first service server 100 can control remotely among the plurality of functions of the multi-function peripheral. The scope information may be stored in advance in the memory 104 by an administrator of the first service server 100. In the example of the present embodiment, a case in which the scope information indicating the print function is stored in the memory 104 will be described. That is, a case in which the first service provided by the first service server 100 is a service which enables printing to be executed by remote control will be described. The scope information may indicate a plurality of functions rather than indicating only one function. That is, although the scope information indicating the print function has been illustrated, if a service enables both printing and scanning, the scope information may indicate both the print function and the scan function.

Since the content of the second and third service servers 110 and 120 are the same as that of the first service server 100, the description thereof will not be provided.

(Structure of Service Management Server 50)

The service management server 50 is a service that executes a proxy authorization process described in Embodiment 2. The service management server 50 includes a controller 52. The controller 52 includes a CPU 53 and a memory 54.

(Registration Process)

The content of the registration process will be described with reference to the sequence diagrams of FIGS. 2 and 3. The registration process is a process of storing, in the authorization table T11 stored in the mediation server 60, a service that is permitted to conduct remote control.

As an example, a case in which a user A registers the first service provided by the first service server 100 as a registration service that is permitted to conduct remote control will be described. Moreover, a case in which the user A possesses the multi-function peripheral 10 will be described. Further, a case in which the user A permits the print function and the scan function among the plurality of functions of the multi-function peripheral 10 to be controlled by remote control will be described. Further, a case in which the user A executes the registration process using the PC 40 will be described. Further, a case in which the service table T1 (see FIG. 5) and the user table T2 (see FIG. 6) are stored in the mediation server 60 will be described.

The user A needs to register the first service user ID and the first service password of the user A in the first service server 100 that provides the first service as preparations. That is, the user A needs to acquire the user account of the first service.

In S90, the user A inputs, to the PC 40 using the operating unit 49, the URL of a registration service that is permitted to conduct remote control of the multi-function peripheral 10. In the example of the present embodiment, the URL of the first service server 100 is input to the PC 40.

In S100, the CPU 41 of the PC 40 accesses the first service server 100 via the Internet 6 based on the URL of the first service server 100. Moreover, the CPU 41 transmits authorization request information to the first service server 100. The authorization request information includes a first service user ID. The first service user ID is information used when the user A logs into the first service server 100. The first service user ID may be acquired by various methods. For example, the first service user ID may be acquired by displaying a login screen on the display unit 48 and receiving the input of the first service user ID using the operating unit 49. Moreover, the first service user ID may be stored in advance in the memory 42.

In S110, the CPU 103 of the first service server 100 transmits service screen information and first redirect information to the PC 40. The service screen information is information for displaying a service screen described later on the display unit 48 of the PC 40. The first redirect information is information for changing an access destination of the PC 40 from the first service server 100 to the mediation server 60. The first redirect information includes scope information, registration service identification information, a registration service URL, and state information. The scope information is information that is read from the memory 104. In the example of the present embodiment, the scope information indicates the print function. The registration service identification information is information for identifying the first service which is the registration service. The registration service URL is information indicating the URL of the first service which is the registration service. The state information is information used for transferring user session information. The user session information is unique identification information used for identifying the user A accessing the first service server 100 and monitoring the behavior thereof.

In S115, the CPU 41 of the PC 40 displays a service screen on the display unit 48 based on the service screen information. Information informing the user of redirection to the mediation server 60 may be displayed on the service screen.

In S120, the CPU 41 transmits authorization request information to the mediation server 60 based on the first redirect information. The authorization request information includes scope information, registration service identification information, a registration service URL, and state information. Due to this, the registration service identification information and the like transmitted from the first service server 100 to the PC 40 are transferred to the mediation server 60 in a mutually associated state.

In S130, the CPU 72 of the mediation server 60 receives the authorization request information. Moreover, the registration service identification information and the scope information are stored in the authorization table T11 (see region R1 in FIG. 8). Moreover, the registration service URL is temporarily stored in the memory 24.

In S140, the CPU 72 transmits login screen information to the PC 40. The login screen information is information for displaying the login screen on the display unit 48 of the PC 40. In S150, the CPU 41 of the PC 40 displays the login screen for receiving a login process on the display unit 48 based on the login screen information. The login process is a process for the user A to obtain user authentication of the mediation server 60.

In S155, the CPU 41 receives the input of the mediation server user ID and the mediation server password from the user A. In S160, the CPU 41 transmits the mediation server user ID and the mediation server password to the mediation server 60.

In S165, the CPU 72 of the mediation server 60 determines whether the authentication of the user was successful. Specifically, it is determined whether the mediation server user ID and the mediation server password transmitted from the multi-function peripheral 10 are stored in the user table T2 (see FIG. 6). This step S165 may in other words be termed that a determination is made on whether the mediation server user ID and the mediation server password transmitted from the PC 40 in S160 matches the mediation server user ID and the mediation server password stored in the mediation server 60. When a negative determination result is obtained (S165: NO), the flow proceeds to S170. In S170, the CPU 103 transmits authentication fail information to the PC 40. In S172, the CPU 41 of the PC 40 displays an error screen indicating the fail in the user authentication of the mediation server 60 on the display unit 14. Then, the flow ends.

On the other hand, when a positive determination result is obtained in S165 (S165: YES), the flow proceeds to S175. In S175, the CPU 72 stores the received mediation server user ID temporarily in the memory 74.

In S180, the CPU 72 transmits authorization reception screen information to the PC 40. The authorization reception screen information is information for displaying an authorization reception screen on the display unit 48 of the PC 40. The authorization reception screen is a screen for receiving a final authorization input of the user A as to whether the registration service will be permitted to control the multi-function peripheral 10 by remote control.

In S190, the CPU 41 of the PC 40 displays the authorization reception screen on the display unit 48 based on the authorization reception screen information. In S195, the CPU 41 receives the authorization input of the user A. For example, the authorization input may be received when tapping on an OK button displayed on the authorization reception screen is detected.

In S200, the CPU 41 transmits permission information to the mediation server 60. The permission information is information indicating the issue of final permission for allowing the registration service to control the multi-function peripheral 10 by remote control.

In S205, the CPU 72 of the mediation server 60 stores the mediation server user ID stored temporarily in S175 in the authorization table T11 in association with the registration service identification information and the scope information stored in S130 (see region R2 in FIG. 8). The reason why a plurality of items of information can be associated in this manner is because the communications performed in S100 to S200 are performed as a series of processes and all communications are associated with common user session information.

In S207, the CPU 72 generates access key information. The access key information may be a one-time random character string. Moreover, the generated access key information is stored in the authorization table T11 in association with the registration service identification information and the scope information stored in S130 (see region R3 in FIG. 8). In this way, the registration service identification information 554, the scope information 555, the mediation server user ID 553, and the access key information 556 are stored in the authorization table T11 in a mutually associated manner.

In S210, the CPU 72 transmits second redirect information to the PC 40. The second redirect information is information for requesting the PC 40 to access an access destination indicated by the registration service URL stored in S210. The second redirect information includes a registration service URL, access key information, and state information.

In S220, the CPU 41 of the PC 40 transmits the access key information and the state information included in the second redirect information to the first service server 100 that provides the first service which is the registration service. The transmitting process is performed based on the registration service URL included in the second redirect information.

In S230, the CPU 103 of the first service server 100 transmits token information request information to the mediation server 60. The token information request information is information for requesting the mediation server 60 to issue token information. The token information request information includes the access key information and the registration service identification information.

In S235, the CPU 72 of the mediation server 60 determines whether the same access key information as the access key information included in the token information request information received in S230 is stored in the authorization table T11 in association with the registration service identification information. When a negative determination result is obtained (S235: NO), the process transmits. When a positive determination result is obtained (S235: YES), the flow proceeds to S238.

In S238, the CPU 72 generates token information and refresh token information. The token information is information for identifying the first service server 100 that provides the registration service. The refresh token information is information used for a token information refresh process described later. The token information and the refresh token information are unique character strings, respectively.

In S240, the CPU 72 stores the generated token information and refresh token information in the authorization table T11 in association with the mediation server user ID (see region R4 in FIG. 8). In this way, the registration service identification information 554, the scope information 555, the mediation server user ID 553, the access key information 556, the token information 551, and the refresh token information 552 are stored in the authorization table T11 in a mutually associated state. The access key information may be discarded because it is not necessary after the token information is acquired.

In S250, the CPU 72 transmits response information to the first service server 100. The response information is information on a response to the token information request information received in S230. The response information includes the token information and the refresh token information generated in S238.

In S260, the CPU 103 of the first service server 100 stores the token information and the refresh token information in the token table T21 in association with the first service user ID (see region R11 in FIG. 7). The first service user ID of the user A may be different from the mediation server user ID of the user A stored in the authorization table T11. In this way, the token information 542, the refresh token information 543, and the first service user ID 541 are stored in the token table T21 in a mutually associated manner.

In S270, the CPU 103 transmits authorization completion screen information to the PC 40. The authorization completion screen information is information for displaying an authorization completion screen on the display unit 48 of the PC 40. In S280, the CPU 41 of the PC 40 displays the authorization completion screen on the display unit 48 based on the authorization completion screen information. An image indicating the completion of registration of the registration service may be displayed on the authorization completion screen.

In S310, the CPU 103 of the first service server 100 transmits multi-function peripheral list request information to the mediation server 60. In S315, the CPU 72 of the mediation server 60 generates multi-function peripheral list information. The multi-function peripheral list information is information indicating one or more multi-function peripherals that the first service server 100 is permitted to control by remote control. An example of a method of generating the multi-function peripheral list information will be described. The CPU 103 transmits a request for the multi-function peripheral list information including the token information (S310). The CPU 72 extracts the token information 551 registered in the authorization table T11. Subsequently, the CPU 72 specifies the mediation server user ID 553 corresponding to the extracted token information 551. Moreover, the CPU 72 extracts the multi-function peripheral identification information 524 associated with the mediation server user ID using the user table T2, whereby the multi-function peripheral list information is generated (S315).

In S320, the CPU 103 receives the multi-function peripheral list information from the mediation server 60. In S325, the CPU 103 stores the received multi-function peripheral list information in the memory 104. After that, the registration process transmits.

(Function Utilization Process)

The content of a function utilization process will be described with reference to the sequence diagram of FIG. 4. The function utilization process is a process of selecting a service that is to execute a process among one or more registration services as a selected service and executing the process by controlling the multi-function peripheral by remote control from the selected service.

As an example, a case in which the user A selects the first service as the selected service will be described. Moreover, a case in which the user A possesses the multi-function peripheral 10 will be described.

In S330, the CPU 41 of the PC 40 logs into the first service server 100 via the Internet 6 based on the URL of the first service server 100. The login may be performed by transmitting the first service user ID and the first service password received by the PC 40 to the first service server 100.

In S335, the CPU 103 of the first service server 100 transmits service screen information to the PC 40 as a response. The service screen information may include the multi-function peripheral list information stored in the memory 104 in S325. In S340, the CPU 41 of the PC 40 displays a service screen on the display unit 48 based on the service screen information. For example, a list of available multi-function peripherals that the first service which is the selected service is permitted to control by remote control may be displayed on the service screen.

In S343, the CPU 41 receives the input of a remote control execution instruction from the user A. The input of the remote control execution instruction involves receiving a selected input such as a target multi-function peripheral and a selected file. The target multi-function peripheral is a multi-function peripheral that executes various processes according to remote control. The target multi-function peripheral may be selected by selecting an arbitrary multi-function peripheral among the available multi-function peripherals in the list table in S340. The selected file is a file used when the target multi-function peripheral executes various processes. For example, when the target multi-function peripheral executes a print process, the selected file may be an image file for printing. Although the example of printing has been illustrated, if a service has the print function and the scan function, the user may select a function to be used.

In S345, the CPU 41 transmits process execution command information to the first service server 100. The process execution command information is information for causing the target multi-function peripheral to execute a specific process using the selected function. The print execution command information includes: target multi-function peripheral identification information indicating the target multi-function peripheral; and a selected file URL indicating the storage location of the selected file. The print execution command information may include the first service user ID input during the login of S330. Alternatively, the print execution command information may include a mediation server user ID.

In S347, the CPU 103 of the first service server 100 determines whether the multi-function peripheral 10 can be controlled by remote control based on the process execution command information. This determination may be made based on whether the same first service user ID as the first service user ID included in the process execution command information is stored in the token table T21 (see FIG. 7). When a negative determination result is obtained (S347: NO), the flow proceeds to S349 and the CPU 72 transmits error information to the PC 40. In S365, the CPU 41 of the PC 40 displays an error screen indicating the fail in the process execution command on the display unit 14. After that, the flow ends.

On the other hand, when a positive determination result is obtained in S347 (S347: YES), the CPU 103 reads, from the token table T21, token information associated with the first service user ID included in the process execution command information. Moreover, the CPU 103 may read the scope information from the memory 104. After that, the flow proceeds to S350. In S350, the CPU 103 transmits function utilization request information to the mediation server 60. The function utilization request information includes service identification information indicating the first service which is the selected service, the selected file URL, target multi-function peripheral identification information, selected function identification information, and token information. The selected function identification information is information indicating the selected function. The selected function is a function selected as a function that the target multi-function peripheral is to execute. The selected function may be determined based on the scope information read from the memory 104. In the example of the present embodiment, the print function corresponds to the selected function. In this way, the function utilization request information and the target multi-function peripheral identification information are transmitted in a mutually associated manner.

In S335, the CPU 72 specifies the multi-function peripheral identification information 524 indicating the same multi-function peripheral as the multi-function peripheral indicated by the target multi-function peripheral identification information from the user table T2 (see FIG. 6).

In S360, the CPU 72 determines, by checking the token information, whether it is allowed to remotely control the multi-function peripheral which is instructed by the function utilization request information to be controlled by remote control. Specifically, it is determined whether a combination of the token information included in the function utilization request information and the multi-function peripheral identification information specified in S355 is stored in the authorization table T11.

In the example of the present embodiment, a combination of the token information (region R31 in FIG. 7) and the multi-function peripheral identification information (region R32 in FIG. 6) included in the function utilization request information is specified. Moreover, the token information 551 of region R41 is specified from the authorization table T11 of FIG. 8. Moreover, the user A is specified from the authorization table T11 (see region R2). Moreover, the multi-function peripheral identification information for identifying the multi-function peripheral possessed by the user A is specified from the user table T2 of FIG. 6 (see region R32). In the example of the present embodiment, a positive determination result is obtained in S360.

When a negative determination result is obtained in S360 (S360: NO), the flow proceeds to S361 and the CPU 72 transmits error information to the PC 40. After that, the flow proceeds to S365. On the other hand, when a positive determination result is obtained in S360 (S360: YES), the flow proceeds to S362.

In S362, the CPU 72 determines whether the function that the function utilization request information requests to use can be controlled by the multi-function peripheral 10 by remote control. Specifically, it is determined whether the selected function indicated by the selected function identification information included in the function utilization request information is within the scope information stored in the authorization table T11.

In the example of the present embodiment, the selected function identification information indicates the print function and the scope information (see region R51 in FIG. 8) of the authorization table T11 indicates the print function and the scan function. Thus, a positive determination result is obtained in S362.

When a negative determination result is obtained in S362 (S362: NO), the flow proceeds to S363 and the CPU 72 transmits error information to the PC 40. After that, the flow proceeds to S365. On the other hand, when a positive determination result is obtained in S362 (S362: YES), the flow proceeds to S370.

In S370, the CPU 72 transmits function utilization instruction information to the multi-function peripheral 10. The function utilization instruction information includes the selected file URL. The function utilization instruction information is information for instructing the multi-function peripheral 10 to execute a process which uses the function specified by the selected function identification information using the file designated by the selected file URL. The function utilization instruction information is transmitted to the multi-function peripheral 10 as XMPP message information. Moreover, the function utilization instruction information is transmitted to the multi-function peripheral 10 using an XMPP connection established between the mediation server 60 and the multi-function peripheral 10. Since the process of establishing the XMPP connection is well-known, detailed description thereof will not be provided.

In S380, the CPU 22 of the multi-function peripheral 10 executes a process based on the function utilization instruction information. In the example of the present embodiment, a print process is executed using the file designated by the selected file URL. After that, the function utilization process ends.

(Advantages of Embodiment 1)

In the technique disclosed in the present specification, in the registration process (see FIGS. 2 and 3), the registration service identification information and the mediation server user ID can be stored in the authorization table T11 provided in the mediation server 60 (S240). The registration service identification information is information for identifying a service server that provides the registration service. The mediation server user ID is information for identifying a multi-function peripheral that permits the remote control of the registration service. Moreover, in the function utilization process (see FIG. 4), the mediation server 60 can receive the service identification information and the target multi-function peripheral identification information from the selected service that executes remote control (S350). The service identification information is information for identifying the service server that provides the selected service. The target multi-function peripheral identification information is information for identifying a multi-function peripheral which is subject to execution of remote control. Moreover, when a combination of the multi-function peripheral and the service server that is instructed to execute remote control in S350 is stored in the authorization table T11 (S360: YES), the mediation server 60 can execute remote control (S380) by transmitting function utilization instruction information to the remote control target multi-function peripheral (S370). In this way, a process of authorizing the first to third service servers 100 to 120 to execute remote control on the multi-function peripheral 10 or 11 can be realized using the mediation server 60. Since the users are not forced to use software for executing remote control, it is possible to improve user's convenience.

The mediation server 60 can: generate the token information for authorizing a service server that provides the registration service (S238); and store the token information in the authorization table together with the mediation server user ID (S240). Moreover, the token information can be also stored in the token table of the service server that provides the registration service (S260). When the service server that executes the remote control is selected (S330), the selected service server transmits the token information stored in the token table to the mediation server 60 together with the service identification information and the target multi-function peripheral identification information (S350). When the token information transmitted from the service server has been registered in the authorization table (S360: YES), the mediation server 60 can permit the service server that transmitted the token information to execute remote control. In this way, since the process of permitting the service server to execute remote control can be executed using the token information, it is possible to improve security.

When personal information such as a user ID or a password is delivered to the service servers that provide the first to third services as authentication information for permitting the remote control on the multi-function peripheral, security problems arise. This is because there is a concern of leakage or theft of person information. In the technique disclosed in the present specification, the process of authorizing the service server to execute remote control can be performed by the mediation server 60. That is, in order to authorize the service server to execute remote control, a user logs into the mediation server 60 using the authentication information (that is, the mediation server user ID and the mediation server password) of the mediation server 60 (S160) and inputs information that permits remote control (S195 and S200). Then, token information which is information for authenticating the remote control is delivered from the mediation server 60 to the service server (S250). That is, in this configuration, the token information can be delivered to the service server as the authentication information for permitting the remote control in place of personal information (that is, the mediation server user ID and the mediation server password). In this way, it is possible to address security problems. Moreover, the service server can perform remote control with the aid of the mediation server 60 if the service server stores the token information. By doing so, since the displayed content of the service screen information (S340) for receiving the input of a remote control instruction can be freely set on the service server side, it is possible to improve the degree of freedom in operation of the service server.

When an access request is transmitted from the PC 40 (S100), the first service server 100 transmits first redirect information including the registration service identification information to the PC 40 as a response (S110). The PC 40 transmits authorization request information to the mediation server 60 based on the first redirect information (S120). In response to the authorization request information, the mediation server 60 transmits the login screen information to the PC 40 (S140). The PC 40 transmits the mediation server user ID and the mediation server password to the mediation server 60 (S160). When the authentication is successful (S165: YES), the mediation server 60 transmits the authorization reception screen information to the PC 40 (S180). In this way, the registration server identification information (S110) and the mediation server user ID (S160) can be transmitted and received by communicating a series of requests and responses. Thus, the registration server identification information (S110) and the mediation server user ID can be treated in association because both items of information are associated with common user session information.

If the token information is transmitted to the PC 40, there is a possibility that the token information is intercepted or altered. In the technique disclosed in the present specification, the mediation server 60 generates the access key information (S207) and transmits the access key information to the PC 40 (S210), and the PC 40 transfers the access key information to the first service server 100 (S220). Moreover, the first service server 100 transmits the token information request information to the mediation server 60 together with the access key information (S230). That is, since generation of the token information can be controlled using the access key information, the token information will not be transmitted to the PC 40. In this way, it is possible to improve security of a communication system.

In the technique disclosed in the present specification, it is determined, based on the scope information, whether the function that is subject to remote control as requested according to the function utilization request information is within the range of one or more functions of which the remote control is authorized. And remote control can be executed (S370) when a positive determination result is obtained (S362: YES). In this way, the remote control execution right can be set for each of the plurality of functions of the multi-function peripheral. Thus, it is possible to set the range of execution right according to the importance of the function. For example, the remote control of the print function having a high running cost may be authorized only to a reliable service and the remote control of the scan function having a low running cost may be authorized to a wide range of various services.

A case in which the function utilization instruction information for instructing the execution of a process by remote control cannot be transmitted from the first to third service servers 100 to 120 directly to the multi-function peripheral 10 or 11 may happen. This is because, although HTTP request information is transmitted to the multi-function peripheral 10 when information is transmitted from the first to third service servers 100 to 120, the HTTP request information transmitted from the outside of the multi-function peripheral 10 is blocked by the firewall or the like of the router 7 or 8. In the technique disclosed in the present specification, it is possible to establish an XMPP connection between the multi-function peripherals 10 and 11 and the mediation server 60. Moreover, it is possible to transmit (S370) the function utilization request information output (S350) from the first to third service servers 100 and 120 to the multi-function peripheral 10 via the mediation server 60. Due to this, since the function utilization request information can be transmitted using the XMPP connection between the multi-function peripherals 10 and 11 and the mediation server 60, it is possible to transmit the function utilization request information which is XMPP message information to the multi-function peripherals 10 and 11 over a firewall or the like. Thus, the multi-function peripherals 10 and 11 can be controlled by remote control from the first to third service servers 100 to 120.

(Embodiment 2)

In Embodiment 2, a proxy authorization process using the service management server 50 will be described. The proxy authorization process is a process in which the service management server 50 executes the process of authorizing the remote control of a registration service as proxy for the user. Since the structure of the communication system 2 used in Embodiment 2 is the same as that of Embodiment 1, the description thereof will not be provided.

(User Registration Process)

The content of the registration process will be described with reference to the sequence diagram of FIG. 9. The registration process is a process of registering users to the service management server 50. As an example, a case in which the user A performs user registration on the service management server 50 will be described.

A user A who wants to register to the service management server 50 accesses the service management server 50 using the PC 40. In S404, the CPU 41 of the PC 40 transmits user registration request information to the service management server 50. In S405, the CPU 53 of the service management server 50 transmits user registration screen information to the PC 40 as a response. In S408, the CPU 41 displays a user registration screen on the display unit 48 based on the user registration screen information. The user registration screen is a screen for receiving the user registration to the service management server 50.

In S409, the CPU 41 receives the input of the user registration by the user A. In the user registration, a service management server user ID, a service management server password, the mediation server user ID, and the like may be received also. In S410, the CPU 41 transmits user registration information to the service management server 50. The user registration information includes the service management server user ID, the service management server password, the mediation server user ID, and the like. In S415, the CPU 53 stores the user registration information in the memory 54. In this way, the user A completes the user registration to the service management server 50.

(Proxy Authorization Process)

The content of the proxy authorization process will be described with reference to the sequence diagram of FIG. 9. As an example, a case in which the user A registers the first service provided by the first service server 100 as a registration service that is permitted to conduct remote control will be described. Moreover, a case in which the user A possesses the multi-function peripheral 10 will be described.

In S420, the user A inputs the service management server user ID and the service management server password to the PC 40 using the operating unit 49. In S430, the CPU 41 transmits login request information to the service management server 50. In S435, the CPU 53 transmits registration service selection reception screen information to the PC 40 as a response. In S440, the CPU 41 displays a registration service selection reception screen on the display unit 48.

In S445, the CPU 41 receives the input of a registration service that is permitted to conduct remote control and a function that is authorized to conduct remote control. In S450, the CPU 41 transmits the input information to the service management server 50.

In S455, the CPU 53 reads the mediation server user ID of the user A from the user registration information of the user A stored in the memory 54. In S460, the CPU 53 transmits proxy authorization request information to the mediation server 60. The proxy authorization request information includes registration service identification information, scope information, and the mediation server user ID read in S455.

In S462, the CPU 72 generates access key information. Moreover, the CPU 72 stores the generated access key information in the authorization table T11 in association with the registration service identification information, the scope information, and the mediation server user ID included in the proxy authorization request information. In S465, the CPU 72 transmits the access key information to the service management server 50. In S470, the CPU 53 transmits the access key information to the first service server 100. In S480, the CPU 103 transmits token information request information to the mediation server 60. Since the content of the subsequent processes are the same as the processing content subsequent to S235 of FIG. 3, the description thereof will not be provided.

(Refresh Process)

A token information refresh process will be described. When the execution conditions of the refresh process are satisfied, the CPU 103 of the first service server 100 transmits refresh request information to the mediation server 60 in S490. The execution conditions of the refresh process may be satisfied when a predetermined period elapses, for example. The refresh request information includes service identification information for identifying the first service server 100 and refresh token information. The refresh token information is the information stored in S260.

In S493, the CPU 72 of the mediation server 60 generates new token information and refresh token information based on the refresh request information and stores the same in the authorization table T11. In S496, the CPU 72 transmits response information including the new token information and refresh token information to the first service server 100. In S498, the CPU 103 stores the received token information and refresh token information in the token table T21.

In the refresh process, it is possible to obviate the need for the service management server 50 to perform proxy authorization. Thus, it is possible to diminish the processing load of the service management server 50.

(Advantages of Embodiment 2)

In the technique disclosed in the present specification, when the user selects a registration service and a function that authorizes remote control (S445), the service management server 50 can execute a process of authorizing the remote control of the registration service (S460). Due to this, as described in S155 of Embodiment 1, the user does not need to input information such as the mediation server user ID or the mediation server password in order to permit the remote control of the registration service. Therefore, it is possible to improve the user's convenience.

Take as an example a case where the first to third services are charged services and the service management server 50 operates a purchase site for purchasing the first to third services. In this case, by merely purchasing a service through access to the service management server 50, the user can execute remote control on the basis of the purchased service, since the service management server 50 executes the proxy authorization process. The user does not need to perform an authorization process for the purchased service. Thus, it is possible to improve the user's convenience.

(Embodiment 3)

In Embodiment 3, a pre-registration process will be described. The advanced registration process is a process in which a user registers a registration service to the mediation server 60 in advance. Since the structure of the communication system 2 used in Embodiment 3 is the same as that of Embodiment 1, the description thereof will not be provided.

(Service Server Registration Process)

The content of a service server registration process will be described with reference to the sequence diagram of FIG. 10. In S500, the CPU 103 of the first service server 100 transmits advanced registration request information to the mediation server 60. The process of S500 may be performed periodically and may be performed in response to activation of the first service server 100. The advanced registration request information includes registration service identification information and scope information.

In S501, the CPU 72 of the mediation server 60 stores the registration service identification information and the scope information included in the advanced registration request information in the authorization table T11. In S502, the CPU 72 transmits registration completion notification information to the first service server 100. In this way, the process of registering the first service server 100 to the mediation server 60 ends.

The second and third service servers 110 and 120 are registered to the mediation server 60 by the same process as the registration process of the first service server 100.

(User Authorization Process)

The content of a user authorization process will be described with reference to the sequence diagram of FIG. 10. As an example, a case in which the user A registers the first service provided by the first service server 100 as a registration server that is permitted to conduct the remote control will be described.

In S520, the user A inputs a mediation server user ID and a mediation server password to the PC 40 using the operating unit 49. In S530, the CPU 41 transmits login request information to the mediation server 60.

In S535, the CPU 72 of the mediation server 60 transmits registration service selection reception screen information to the PC 40 as a response. In S540, the CPU 41 displays a registration service selection reception screen on the display unit 48. The registration service selection reception screen is a screen for receiving the input of a registration service selected among the first to third services stored in the mediation server 60 according to the service server registration process.

In S545, the CPU 41 receives the input of a selected registration service that is permitted to conduct remote control. In S550, the CPU 41 transmits selected service information indicating the selected service and a mediation server user ID to the mediation server 60.

In S556, the CPU 72 generates access key information. Moreover, the CPU 72 specifies the registration service identification information and the scope information stored in the authorization table T11 based on the selected service information. Moreover, the CPU 72 stores the generated access key information and the received mediation server user ID in the authorization table T11 in association with the registration service identification information and the scope information.

In S565, the CPU 72 transmits the access key information and the mediation server user ID to the first service server 100. In S580, the CPU 103 transmits token information request information to the mediation server 60. Since the content of the subsequent processes are the same as the processing content subsequent to S235 of FIG. 3, the description thereof will not be provided.

(Advantages of Embodiment 3)

In the technique disclosed in the present specification, the registration service identification information and the scope information can be stored in advance in the authorization table T11 (S501). Thus, it is possible to reduce the labor of the user and to improve the user's convenience.

While specific embodiments of the present invention have been described in detail above, such description is for illustrative purposes only and is not intended to limit the scope and claims of the invention. Techniques described in the claims of the invention include various modifications and changes made to the specific examples illustrated above. Variants according to the above embodiments are listed below.

(First Modification)

Figure 2:
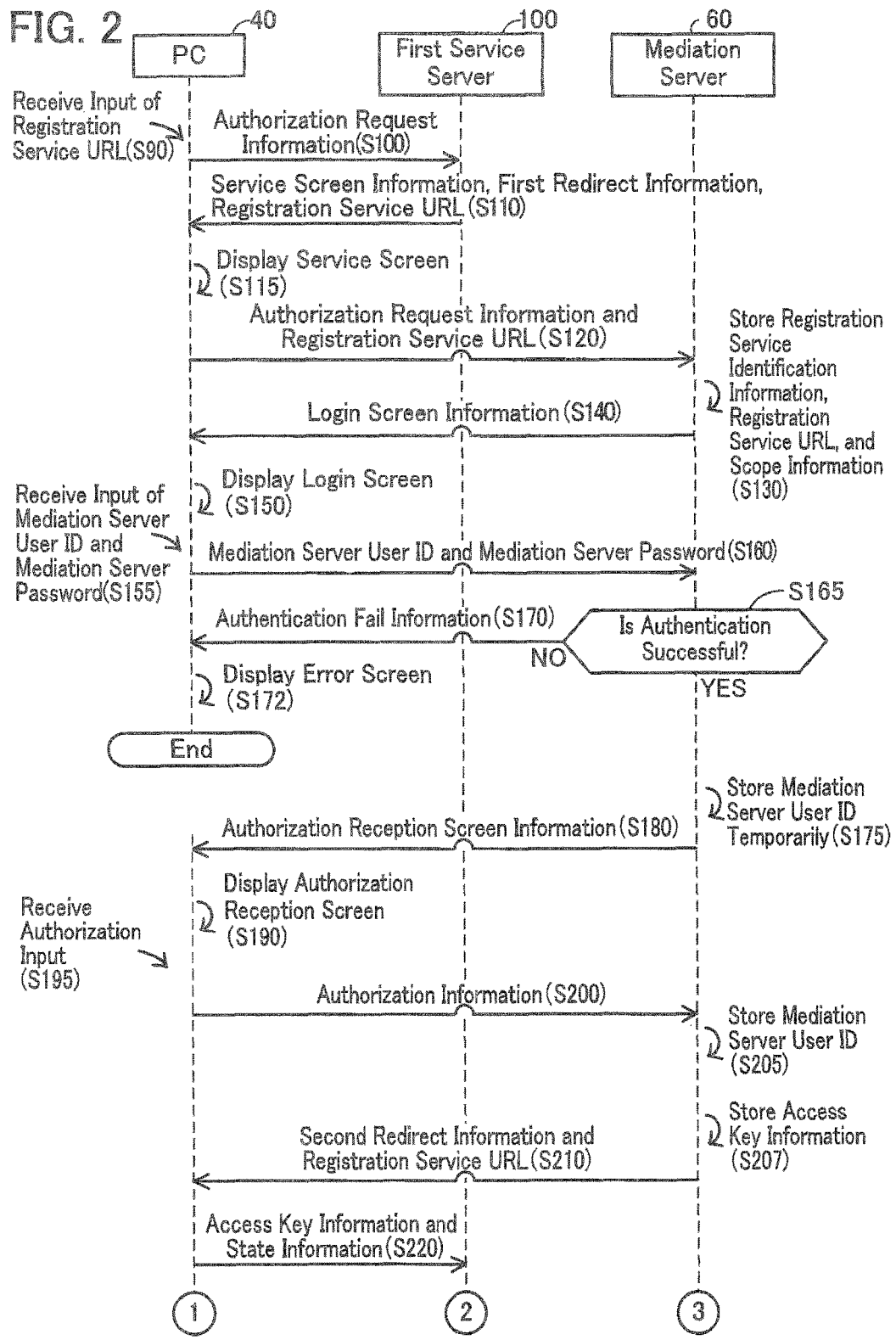
Figure 3:
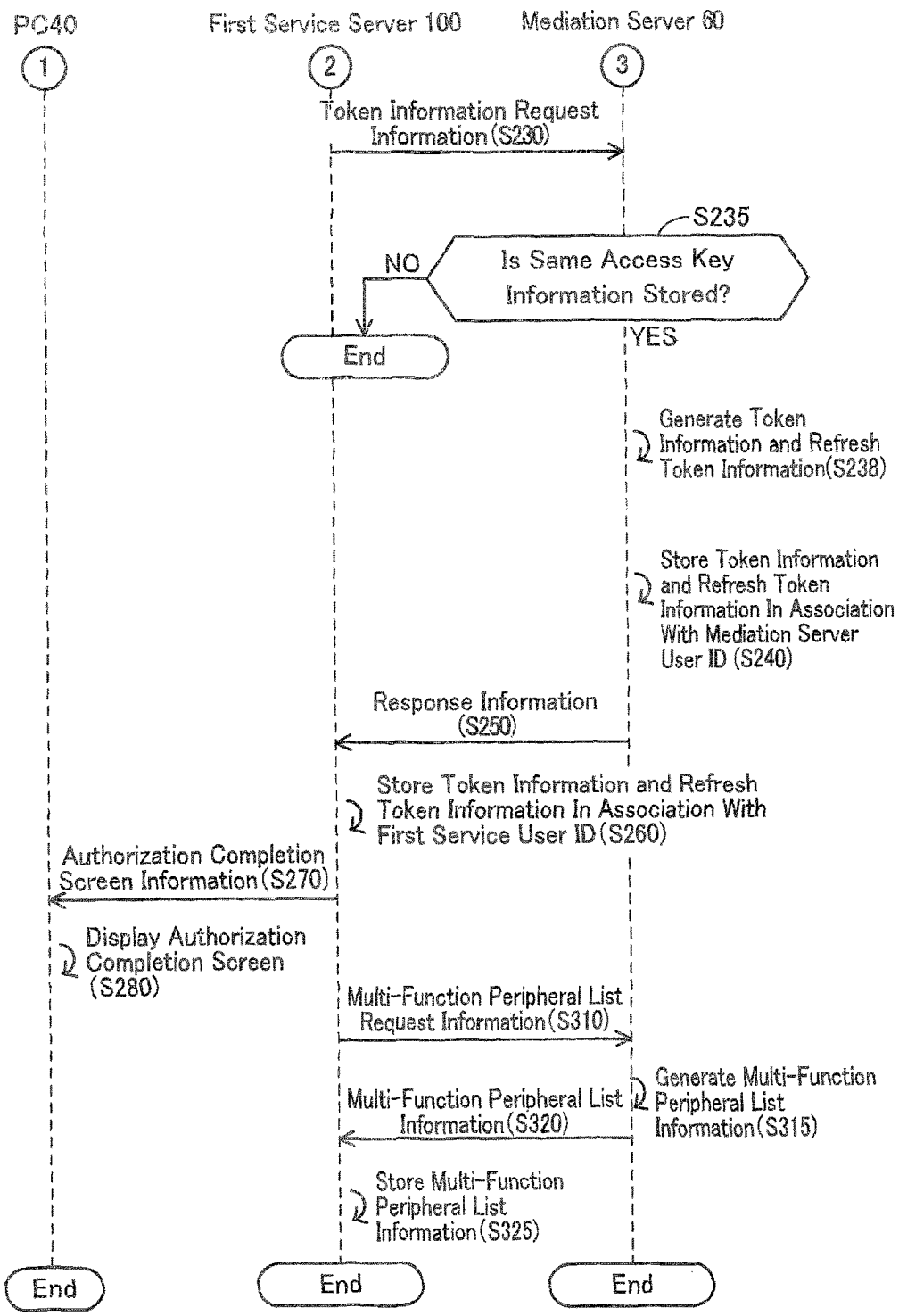

In S160 of FIG. 2, although the mediation server user ID is transmitted to the mediation server 60, the present invention is not limited to this. An arbitrary type of information may be transmitted to the mediation server 60 as long as the information can identify a multi-function peripheral which is subject to execution of remote control. For example, the multi-function peripheral identification information of a multi-function peripheral which is subject to execution of remote control may be transmitted to the mediation server 60. Moreover, in S240, the multi-function peripheral identification information may be stored in the authorization table T11 instead of the mediation server user ID in association with the registration service identification information and the like.

(Second Modification)

The proxy authorization process described in Embodiment 2 and FIG. 9 is not limited to the process which uses the service management server 50. The proxy authorization process may be executed using the first to third service servers 100 to 120. In this case, the first to third service servers 100 to 120 may include a high-level service server and a low-level service server. Moreover, the high-level service server may execute a process of authorizing the remote control of the low-level service server as proxy for the user. Moreover, the type of functions of the multi-function peripheral that the low-level service server can control by remote control may be included in the type of functions of the multi-function peripheral that the high-level service server can control by remote control.

As an example, a case in which the second service server 110 is a high-level service server and the first service server 100 is a low-level service server will be described. In this case, the service management server 50 may be replaced with the second service server 110 in the sequence diagram of FIG. 9.

In S460, the second service server 110 transmits proxy authorization request information to the mediation server 60. The proxy authorization request information may include the service identification information of the second service server 110, the registration service identification information (that is, the service identification information of the first service server 100 which is the low-level service server), the scope information, and the mediation server user ID.

In S462, access key information is generated. In this case, it may be determined whether the range of functions that the low-level service server is authorized to execute by remote control is within the range of functions that the high-level service server can execute by remote control, and the access key information may be generated when a positive determination result is obtained. The determination may be performed by comparing the range of functions indicated by the scope information and the range of functions that the second service server 110 can execute by remote control.

According to the communication system and the like disclosed in the second modification, the high-level service server can set the remote control right to the low-level service server within the range of functions included in the high-level service server. Due to this, it is possible to eliminate the labor of the user setting the remote control right. Moreover, it is possible to obviate the need to install the service management server 50.

(Third Modification)

The present invention is not limited to an embodiment in which the remote control of the multi-function peripheral 10 is performed when various types of information (for example, the process execution command information in S345) are transmitted from the PC 40. The first service server 100 may control the multi-function peripheral 10 by remote control periodically. For example, the first service server 100 may transmit the function utilization request information to the mediation server 60 in S350 whenever a predetermined period (for example, one day) elapses. The function used in this case may be a function of acquiring various types of information (for example, total print count information) stored in the multi-function peripheral 10, for example. In S380, the multi-function peripheral 10 may transmit various types of information stored in the memory 24 to the first service server 100 via the mediation server 60. In this way, it is possible to monitor the multi-function peripheral 10 from the first service server 100. For example, when the first service server 100 provides a remote-controlled print service, it is possible to monitor a total print count and the state of the multi-function peripheral.

(Other Modifications)

In S110, a method of setting the access destination of the PC 40 to the mediation server 60 is not limited to the method which uses redirection, but a method which uses links may be used. Moreover, similarly, links may be used in S210.

The present invention is not limited to an embodiment in which the registration service URL is transmitted from the first service server 100 to the mediation server 60 (S110 and S120) and is temporarily stored in the memory 24 of the mediation server 60 (S130). For example, the registration service URL may be stored in advance in the memory 24.

In S370, a method of transmitting the function utilization request information from the mediation server 60 to the multi-function peripheral 10 is not limited to the method which uses an XMPP connection. An optional method may be used as long as the information can be transmitted over a firewall.

Although an embodiment in which the first to third service servers 100 to 120 provide the first to third services, respectively, has been described, the present invention is not limited to this embodiment. One server may provide a plurality of services.

The multi-function peripherals connected so as to be communicable with the mediation server 60 are not limited to the multi-function peripherals 10 and 11, but three or more multi-function peripherals may be present. The service servers connected to the Internet 6 are not limited to the first to third service servers 100 to 120, but four or more service servers may be present. Although the multi-function peripherals 10 and 11 are illustrated as an example of a device included in the communication system 2, the present invention is not limited to this. The configuration may also adopt a sewing machine that performs stitching or quilting of a predetermined image based on instruction data. The configuration may also adopt a sewing machine that performs decorative stitching or sewing to form work pieces or products based on image data. The configuration may also adopt a 3D printer that generates 3D images via spraying or machining based on instruction data or the like. The device may be a sensor that acquire certain information periodically.

The scope information may be input by the user, for example, without being limited to an embodiment in which the scope information is stored in advance in the first to third service servers 100 to 120. For example, in S90, the input of the type of a function that is controlled by remote control may be received. In S100, the scope information indicating the function input in S90 may be transmitted to the service server 100. In S110, the first service server 100 may include the scope information received from the PC 40 in the first redirect information. In this way, the user can select a remote-controlled function.

The selected function identification information transmitted in S350 may be determined according to various methods. For example, in S343, the input of the selected function may be received from the user. Moreover, the selected function identification information determined based on the input selected function may be transmitted from the PC 40 to the service server 100 in S345. In this way, the remote-controlled function can be selected by the user.

The multi-function peripheral list request information transmitted in S310 may include information for identifying services (for example, registration service identification information) and information for identifying users (for example, mediation server user ID). The CPU 72 of the mediation server 60 can generate multi-function peripheral list information using a combination of these items of information (S315). In this case, the token information may not be included.

The service table T1 of FIG. 5, the user table T2 of FIG. 6, the token table T21 of FIG. 7, and the authorization table T11 of FIG. 8 are examples. These items of information may be stored in various forms. Moreover, a plurality of items of multi-function peripheral identification information 524 and a plurality of items of mounted function information 525 may be stored in the user table T2 of FIG. 6 in association with one user.

The scope information may not be used. In this case, it is possible to eliminate the process of S362. The access key information may not be used. In this case, token information may be communicated instead of the access key. It is possible to eliminate the process of S362. From the above, generally speaking, the communication system 2 may comprise at least "transmitting first server identification information", "transmitting first access target information", "storing the first server identification information", "transmitting second access target information", "transmitting received second access target information and second server identification information", and "causing the second server to access an image forming device". As a specific example, the multi-function peripheral 10 may execute at least S120, S160, S240, S345, S350 and S370.

The authorization target may be a specific multi-function peripheral only. The authorization target may be all multi-function peripherals possessed by the user. Moreover, the authorization target may be specific function identification information. This is a case in which all of the multi-function peripherals possessed by the user are authorized to conduct the specific function (for example, print). Moreover, the authorization target may be a combination of a multi-function peripheral and function identification information.

What is claimed is:

1. A communication system comprising:
a plurality of image forming devices;
a plurality of service servers;
a terminal; and
a relay device,
wherein
the relay device is configured to connect with the plurality of image forming devices, the terminal, and the plurality of service servers,
wherein a definitive registered service server selected from among a plurality of preliminary registered service servers is a device configured to access an access target image forming device via the relay device after an advanced registration process, a definitive registered service server selection process and an access process are conducted,
the plurality of preliminary registered service servers is registered in the relay device from among the plurality of service servers by the advanced registration process,
the definitive registered service server is selected from among the plurality of preliminary registered service servers by the definitive registered service server selection process, and
the access target image forming device is a device to be an access target of the definitive registered service server,
wherein in the advanced registration process:
any of the plurality of service servers is configured to transmit service server identification information identifying a respective service server,
the relay device is configured to:
receive the service server identification information from any of the plurality of service servers; and
store the received service server identification information in a memory provided in the relay device to register the service server in the relay device as a preliminary registered service server,
wherein in the definitive registered service server selection process:
the terminal is configured to transmit request information to the relay device,
the relay device is configured to transmit input accepting screen information to the terminal when the request information is received under a situation where the plurality of preliminary registered service servers is registered in the relay device, the input accepting screen information causing a display provided in the terminal to display an input accepting screen, the input accepting screen configured to accept an input of a selection of the definitive registered service server from among the plurality of preliminary registered service servers stored in the memory, and the input accepting screen configured to accept an input of access target information identifying the access target image forming device, the terminal is configured to transmit definitive registered service server identification information identifying the definitive registered service server and the access target information to the relay device, the relay device is configured to store the definitive registered service server and the access target information transmitted from the terminal in association with each other in the memory such that the definitive registered service server is registered in the relay device, wherein in the access process:

a specific service server that is one of the plurality of service servers is configured to transmit, to the relay device, specific service server identification information identifying the specific service server from among the plurality of service servers, the relay device is configured to:

receive the specific service server identification information from the specific service server;

determine, by using the definitive registered service server identification information stored in the memory of the relay device, whether the specific service server identified by the received specific service server identification information is registered in the relay device as the definitive registered service server; and cause the specific service server to access the access target image forming device identified by the access target information stored in the memory of the relay device, when it is determined that the specific service server is registered in the relay device as the definitive registered service server.

2. The communication system according to claim 1, wherein each of the plurality of image forming devices includes a plurality of functions, a selected function selected from among the plurality of functions, and executed in the access target image forming device identified by the access target information is selected by the each of the plurality of preliminary registered service servers based on a content set in each of the plurality of preliminary registered service servers in advance.

3. The communication system according to claim 2, wherein in the advanced registration process, any of the plurality of service servers is further configured to transmit selected function identifying information to the terminal, the selected function identifying information identifying the selected function, and in the access process, the specific service server is further configured to transmit, to the relay device, the selected function identifying information identifying the selected function selected by the specific service server.

4. The communication system according to claim 1, wherein in the advanced registration process:

the relay device is configured to:

generate token information identifying each of the plurality of service servers, respectively;

store the generated token information in the memory, in association with the access target information transmitted from the terminal; and transmit the generated token information to each of the plurality of service servers, and each of the plurality of service servers is configured to store the token information transmitted from the relay device in a service server memory provided in each of the plurality of service servers, wherein in the access process:

the specific service server is configured to transmit the token information to the relay device in a case that the token information identifying the specific service server is stored in the service server memory of the specific service server, and the relay device is configured to:

receive the token information from the specific service server;

determine whether the received token information is stored in the memory of the relay device in association with the access target information; and cause the specific service server to access the access target image forming device identified by the associated access target information, in a case that the received token information is stored in the memory in association with the access target information.

5. A relay device comprising:

a communication interface configured to communicate with a plurality of image forming devices, a plurality of service servers, and a terminal;

a processor; and a memory storing computer-readable instructions, wherein a definitive registered service server selected from among a plurality of preliminary registered service servers is a device configured to access an access target image forming device via the relay device after an advanced registration process, a definitive registered service server selection process and an access process are conducted, the plurality of preliminary registered service servers is registered in the relay device from among the plurality of service servers by the advanced registration process, the definitive registered service server is selected from among the plurality of preliminary registered service servers by the definitive registered service server selection process, and the access target image forming device is a device to be an access target of the definitive registered service server, wherein the computer-readable instructions, when executed by the processor, cause the relay device to execute the advanced registration process, where in the advanced registration process, the computer-readable instruction, when executed by the processor, cause the relay device to:

receive service server identification information from any of the plurality of service servers, the service server identification information identifying a service server; and store the received service server identification information in the memory to register the service server in the relay device as a preliminary registered service server, wherein the computer-readable instructions, when executed by the processor, cause the relay device to execute the definitive registered service server selection process, where in the definitive registered service server selection process, the computer-readable instruction, when executed by the processor, cause the relay device to:

transmit input accepting screen information to the terminal when a request information is received under a situation where the plurality of preliminary registered service servers is registered in the relay device, the input accepting screen information causing a display provided in the terminal to display an input accepting screen, the input accepting screen configured to accept an input of a selection of the definitive registered service server from among the plurality of preliminary registered service servers stored in the memory, and the input accepting screen configured to accept an input of access target information identifying the access target image forming device, receive definitive registered service server identification information identifying the definitive registered service server and access target information from the terminal, and store the definitive registered service first server identification information and the access target information transmitted from the terminal in assocation with each other in the memory, such that the definitive registered service server is registered in the relay device, wherein the computer-readable instructions, when executed by the processor, cause the relay device to execute the access process, where in the access process, the computer-readable instruction, when executed by the processor, cause the relay device to:

receive specific service server identification information from a specific service server that is one of the plurality of service servers, the specific service server identification information is for identifying the specific service server from among the plurality of service servers, determine, by using the definitive registered service server identification information stored in the memory, whether the specific service server identified by the received specific service server identification information is registered in the relay device as the definitive registered service server and cause the specific service server to access the access target image forming device identified by the access target information stored in the memory, when it is determined that the specific service server is registered in the relay device as the definitive registered service server.

6. The relay device according to claim 5, wherein each of the plurality of image forming devices includes a plurality of functions, a selected function selected from among the plurality of functions and that is to be executed by the access target image forming device identified by the access target information is selected by each of the plurality of preliminary registered service servers based on a content set in each of the plurality of preliminary registered service servers, respectively, in advance.

7. The relay device according to claim 5, wherein in the advanced registration process, the computer-readable instructions further cause the relay device to:

generate token information identifying each of the plurality of service servers, respectively;

store the generated token information in the memory in association with the access target information transmitted from the terminal; and transmit the generated token information to each of the plurality of service servers so that the token information is stored in a service server memory provided in each of the plurality of service servers, respectively, wherein in the access process, the computer-readable instructions further cause the relay device to:

receive the token information from the specific service server, when token information identifying the specific service server is stored in the service server memory provided in the specific service server, determine whether the received token information is stored in the memory of the relay device in assocation with the access target information, and cause the specific service server to access the access target image forming device identified by the associated access target information, in a case that the received token information is stored in association with the access target information.

* * * * *